MAGNETIC HEAD WITH NOTCHED POLE TIPS

INVENTOR
Hiroshi Sugaya

BY Stevens, Davis, Miller & Mosher
ATTORNEYS

INVENTOR
Hiroshi Sugaya

BY Stevens, Davis, Miller & Mosher
ATTORNEYS

INVENTOR
Hiroshi Sugaya

BY Stevens, Davis, Miller & Mosher
ATTORNEYS

United States Patent Office 3,440,360

Patented Apr. 22, 1969

3,440,360

MAGNETIC HEAD WITH NOTCHED POLE TIPS

Hiroshi Sugaya, Ashiya-shi, Japan, assignor to Matsushita Electric Industrial Co., Ltd., Osaka, Japan, a corporation of Japan Filed Sept. 29, 1965, Ser. No. 491,146
Claims priority, application Japan, Oct. 3, 1964 (utility model), 39/78,332; Oct. 31, 1964 (utility model), 39/85,517
Int. Cl. G11b 5/24
U.S. Cl. 179—100.2 2 Claims

ABSTRACT OF THE DISCLOSURE

A magnetic head comprising a core having spaced pole tips defining a signal gap therebetween and a head tip mounted adjacent the core bridging the gap. The head tip has a width thicker than that of the recording track and on the side opposite the gap is provided with a notch formed at substantially right angles to the gap.

The present invention relates generally to magnetic recording and reproducing head structures, and particularly to such structures which prolong the lives of magnetic heads without altering their functions in the least.

Recently, magnetic recording techniques have made a remarkable progress, and especially, efforts are being paid to the improvement of the techniques of recording extremely high frequency information on tapes such as those used in video tape recorders, hereinafter to be referred to as VTR.

In order to record extremely high frequency signals of, for example, several megacycles on a tape as is used in VTR, it is necessary to increase the relative speed of the tape to the magnetic head, say, several scores of meters per second. This is because the minimum wave length for recording on a tape is limited to the order of several microns on account of the restrictions on the size of the magnetic tapes and the magnetic heads and also depending upon the property of the materials from which such heads are manufactured. Now, if the minimum wave length which can be recorded is designated as $\lambda_{min.}$, and if the highest frequency with which recording is to be made is designated as $f_{max.}$, the necessary relative speed between the magnetic head and the tape is determined by:

$$V=_{min.}\cdot f_{max.}$$

For example, if $\lambda_{min.}=4\mu m.$, and $f_{max.}=5$ mc. then $V=20$ m./sec.

Therefore, in order to keep the relative speed between the magnetic head and the tape at a high level, the conventional system as is employed in audio tape recorders wherein the magnetic head is fixed in the assembly and only the tape itself is adapted to make one-way travel cannot be used. Thus, it is necessary that the magnetic head be rotated as fast as is practical so that the signals may be recorded either helically or vertically on a magnetic tape of a broad width. In such recording system, however, there is a necessity that the width of the track of the magnetic head be as small as is practical and that the wear of the tape be kept within economically permissible limits by slowing down the travelling speed of the tape. In practice, a width in the range 0.1–0.3 mm. is most often used.

Due to the small width of the track and to the extremely high relative speed between the magnetic head and the tape as discussed in the above, the wear of the magnetic heads in conventional devices has been remarkably great, and especially in those magnetic heads whose track widths are as small as 0.1–0.2 mm. their lives have lasted for only several scores of hours, and this limited duration has constituted a serious problem in the practical use of conventional heads.

In order to solve these problems, it is the primary object of the present invention to provide an improved magnetic head with its life prolonged as long as ten times the life of the conventional magnetic heads without its functions being affected in the least.

Another object of the present invention is to provide a magnetic head of the type as described above wherein the head tip is given a width broader than the width of the recording and reproducing track and a notch is provided in the vicinity of the gap so that the gap may has a length identical to the width of the said track in order to prolong the duration of the magnetic head.

Still another object of the present invention is to provide a magnetic head of the type as described above wherein the magnetic head is provided with a notch formed by cutting out a portion at the longitudinal end of the gap at substantially right angles to prevent clogging of the head.

Yet another object of the present invention is to provide a magnetic head of the type as described above wherein the said notch is filled with a non-magnetic material having a hardness and a wearing characteristic equal to those of the head tip as another means of preventing clogging of the head.

Other objects and many more attendant features of the present invention will become obvious by reading the following descriptions. In the following descriptions, some of the preferred embodiments of the invention are shown in detail in connection with the accompanying drawings, wherein.

Figure 1:
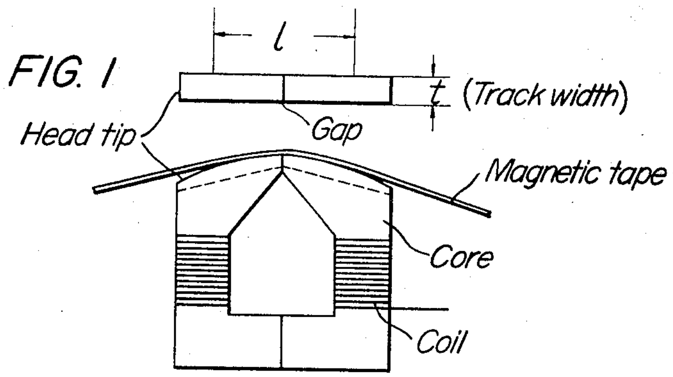
FIG. 1 illustrates the structure of a typical conventional magnetic head.
Figure 2:
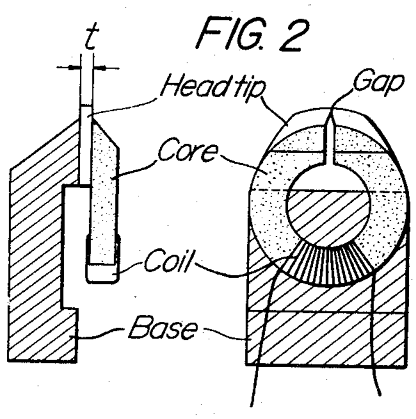
FIG. 2 illustrates the structure of another typical conventional magnetic head.

Now, referring to the drawings, conventional magnetic heads in general have been of the shape as that shown in FIG. 1, wherein the width $t$ of the track is identical with the thickness of the core of the magnetic head. Among those magnetic heads now being used in VTR systems, in particular, there are those of the type wherein only the portion which is brought into contact with the magnetic tape is made of, for example, a very hard magnetic metal as shown in broken lines in FIG. 1 and the core is made of a material such as ferrite which hardly attenuates high frequency waves. Furthermore, there are those magnetic heads of the structure as shown in FIG. 2 which is an example of the magnetic head having a small width of the track. In the latter case, the magnetic flux induced in the coil is conducted to the material such as ferrite which shows small attenuation in high frequencies, and this material is placed in sidewise contact with the head tip having a gap of a predetermined dimension.

Regarding the magnetic head of the type as shown in FIG. 1, there are such disadvantages that in the event the width of the track is small, not only the duration of the head itself is shortened, but in view of the sequence that the thickness of the core should be accordingly as small, the magnetic resistance of the core increases and causes a marked decrease in the efficiency of the magnetic head. In addition to this, there will arise a difficulty in the manufacturing techniques and this difficulty will result in a very poor yield in the manufacture of magnetic heads. Furthermore, magnetic heads of the type in FIG. 1 have been manufactured usually by the steps comprising manufacturing heads with a width $t$ of track as large as 20–50 mm.; cutting them into pieces of a predetermined width; and winding a coil round each core. Such being the practice, if a track with a small width is to be made, the head itself tends to be fragile and this makes it difficult to wind a coil round the core.

On the other hand, magnetic heads of the specific type shown in FIG. 2 are manufactured by first making a head tip with a width corresponding to the width of the track and then this tip is put together with other parts after such process as the heat treatment. Therefore, there arises such problem as the curving of the tip of the head due particularly to heat treatment. This not only affects the duration of the head, but also affects the yield to a great extent.

Figure 3:
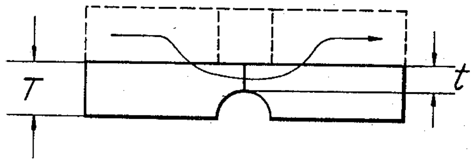
FIG. 3 is an example of the tip structure of the magnetic head of the present invention.
Figure 4:
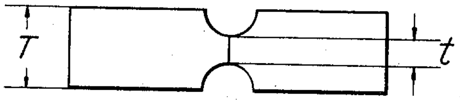
FIG. 4 is another example of the tip structure of the magnetic head of the present invention.

The present invention has its object to easily and effectively eliminate all of these disadvantages of conventional magnetic heads. To describe it more specifically, a head tip having a considerable thickness T is first made, as shown in FIG. 3 and FIG. 4, and then a part of the length of the tip is cut off either at one longitudinal slide or at both slides so that the remainder of the length of the tip may assume the predetermined width of the track.

Figure 5:
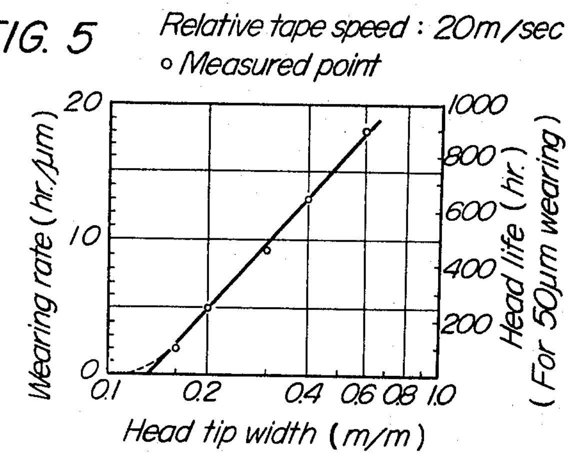
FIG. 5 is a diagram of the characteristics showing the relationship between the width of the tip of the magnetic head and the duration of the said head.

It has been found that by these steps the thickness of the tip of the magnetic head is effectively and virtually increased and that the duration of the magnetic head is markedly prolonged. According to a number of tests conducted, the relationship between the width T of the head tip and the duration of the head, as shown in FIG. 5 when the relative speed between the magnetic head and the tape was 20 m./sec., was obtained. In view of the fact that a desired duration of the head can be selected from this diagram, a reasonable design of the overall system can be made by arranging so that the duration of the head may match the duration of other parts of VTR systems.

In manufacturing the magnetic heads of the type shown in FIG. 1 by the method of the present invention, the cores are given a substantial thickness and this realizes a low magnetic resistance in the core portion, which in turn elevates not only the efficiency of the magnetic heads but also enhances their mechanical strengths, and accordingly, the yield in their manufacture is increased.

The method of the present invention, when applied to the manufacture of the magnetic heads of the type shown in FIG. 2, permits the head tips to be processed or heat-treated while they have substantial thickness, and this contributes greatly toward the inhibition of a reduction in the yield due to the cracking or the curving of the heads which occurs at the time they are manufactured. When the method of the present invention is applied to the head of the type shown in FIG. 2, it is preferred that the notch be provided at only one edge as shown in FIG. 3 rather than providing the notch at both edges of the gap as shown in FIG. 4 and also that the main magnetic core with a coil wound about it be attached to that side of the tip opposite the side where the notch is formed, since such arrangement insures a shorter path for the magnetic flux induced in the coil as compared with the arrangement where the magnetic coil is attached on the side where the notch is formed, and also permits the magnetic flux to reach the head gap with increased easiness, and enhances the properties of the magnetic heads themselves.

Figure 6:
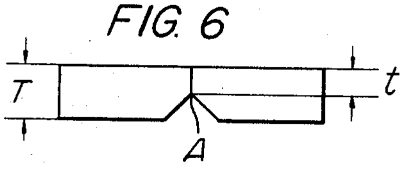
FIG. 6 is still another example of the tip structure of the magnetic head of the present invention.
Figure 7:
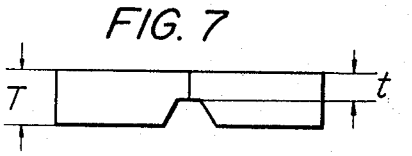
FIG. 7 is yet another example of the tip structure of the magnetic head of the present invention.
Figure 8:
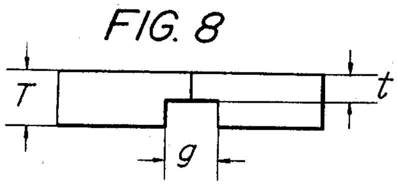
FIG. 8 is still another example of the tip structure of the magnetic head of the present invention.

As for the shape of the notch to be formed at the portion of the gap, those shown in FIG. 6, FIG. 7 and FIG. 8 are considered in addition to the shapes shown in FIG. 3 and FIG. 4. Tests were conducted as to the effects of these shapes, and it has been found that in the case of the shape shown in FIG. 6, dust was apt to stick to the point A and often caused clogging of the head. As a result of a number of tests, it has been found also that clogging of head occurs always at the point A shown in FIG. 6. Therefore, what is necessary for the tip of the shape of FIG. 6 is that the notch be filled with a material having a hardness equal to that of the head tip by some appropriate means.

It has been found also that the head tips of the types as shown in FIG. 7, FIG. 8, FIG. 3 and FIG. 4 where the notches are formed at substantially right angle at the longitudinal edges of the gaps, without any filling made at the notches, do not develop clogging of the head at all.

It is generally effective, of course, to provide a filling for the notches. However, a careful attention must be paid so as to select a filling material having a hardness and a wear characteristic substantially equal to those of the head tip and to be sure that the material is non-magnetic, and also one must choose an appropriate method of filling.

A disadvantage of the tips of the type of FIG. 6 is that the width of the track which is actually recorded on the magnetic tape fails to be sharp and that the leakage of the magnetic field at the point A contributes also to the recording, resulting in an expanded effective width of the track which is a cause for cross-talks.

With the structure as shown in FIG. 8, on the other hand, it is possible to amplify or attenuate a particular frequency by the appropriate selection of the width of g. For example, in VTR systems, video signals are recorded on the tape in the form of modulated frequency. If, in this case, the carrier frequency is designated as $f_c$, the wave length which is to be recorded on the tape is determined by: $\lambda_c = V/f_c$. Therefore, in order to comply with the objects of the present invention, an appropriate selection of the $g$ is made by: $g = nV/f_c$ (wherein $n$ is an integer) so that the carrier frequency is thereby erased at the portion of the notch $g$ and is not reproduced. Therefore, the notch portion will never produce any undesirable effect at the time of reproduction.

Figure 9:
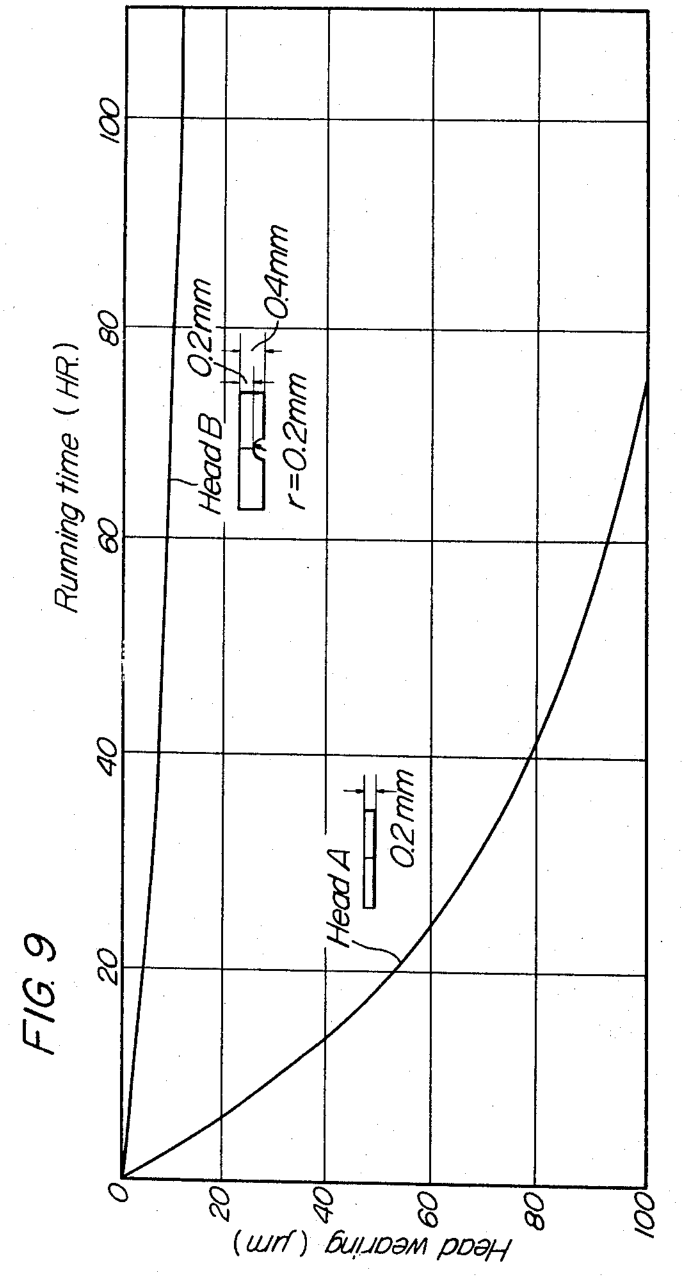
FIG. 9 is a diagram of the characteristics of the magnetic head of the present invention as compared with those of the conventional magnetic head.

A comparative wear test was conducted on the magnetic heads A with a head tip having a track width of 0.2 mm. and on the magnetic heads B with a head tip made of the same metal as for the tip of the heads A and having a width of 0.4 mm. in general except for the portion of the gap which is made so as to have a width of 0.2 mm. which corresponds to the width of the track by forming a semicircular notch having a radius of 0.2 mm. This test was conducted under the same conditions by using a video tape and at the relative speed of 20 m./sec. A result as shown in FIG. 9 was obtained. Now, assuming that the life of the head tip ends as the wear of the head tip has reached 50 $\mu$m., the magnetic heads B of the present invention lasted for over 500 hours in contrast to the conventional magnetic heads A having a width of track of 0.2 mm. which lasted for only 20 hours. On the other hand, comparison of the functions of both magnetic heads were conducted. No appreciable difference was noted as to the output and the head clogging. In some of the magnetic heads of the present invention having notch formation, an output slightly greater than that of the conventional heads was observed because the magnetic reluctance of head tip became slightly lower. The result of the comparison test is considered to have been obtained by the fact that the head tips had a substantial thickness which were hardly succeptible to mechanical stresses occurring during the course of the manufacture and that a high magnetic permeability of the head tips was maintained.

What is claimed is:

1. A magnetic head of composite type having a head tip having a width broader than the width of the recording and reproducing track and a juxtaposed magnetic core formed from a magnetic material different from the material forming said tip and having spaced pole tips defining a signal gap therebetween, a notch provided in one side of the head tip in the vicinity of said gap, the remaining width of the tip being equal to the predetermined width of the track and said notch being provided in the side of the head tip opposite to the side where said core is attached.

2. A composite magnetic head having a head tip having a width broader than the width of the recording and reproducing track and a juxtaposed magnetic core having a linear gap therein, a notch provided in at least one side of the head tip in the vicinity of said linear gap contributing toward recording and reproduction, said notch functioning as another gap, the length of said notch being selected so as to attenuate the carrier frequency of the signal recorded by frequency modulation; and that the longitudinal length of said gap is equal to the predetermined width of the track.

References Cited

UNITED STATES PATENTS

| | | | |
|---|---|---|---|
| 3,060,279 | 10/1962 | Harrison | 179—100.2 |
| 3,244,818 | 4/1966 | Bick et al. | 179—100.2 |
| 3,171,903 | 3/1965 | Wheeler et al. | 179—100.2 |

BERNARD KONICK, *Primary Examiner.*

J. RUSSELL GODEAU, *Assistant Examiner.*

U.S. Cl. X.R.

340—174.1; 346—74